(12) United States Patent
Nakamura et al.

(10) Patent No.: US 7,697,310 B2
(45) Date of Patent: Apr. 13, 2010

(54) CONTROL APPARATUS FOR INHIBITING SYNCHRONOUS-RECTIFIER SWITCHING ELEMENTS AT LOW OUTPUT CURRENT FOR A VOLTAGE TRANSFORMING APPARATUS

(75) Inventors: Kimikazu Nakamura, Handa (JP); Tsuyoshi Yamashita, Anjo (JP)

(73) Assignee: DENSO Corporation, Kariya (JP)

( * ) Notice: Subject to any disclaimer, the term of this patent is extended or adjusted under 35 U.S.C. 154(b) by 319 days.

(21) Appl. No.: 11/699,076

(22) Filed: Jan. 29, 2007

(65) Prior Publication Data

US 2007/0177410 A1   Aug. 2, 2007

(30) Foreign Application Priority Data

Jan. 27, 2006   (JP)   ............................... 2006-019746

(51) Int. Cl.
    *H02M 3/335*   (2006.01)
(52) U.S. Cl. ............................. 363/127; 363/79; 363/81
(58) Field of Classification Search ................. 363/127, 363/21.06, 21.14, 79–81, 17, 98, 132
    See application file for complete search history.

(56) References Cited

U.S. PATENT DOCUMENTS 6,618,274 B2 *   9/2003   Boylan et al. .................. 363/17

7,224,590 B2 *   5/2007   Lin .......................... 363/21.06

FOREIGN PATENT DOCUMENTS

| DE | 2000-354370 | 12/2000 |
|----|-------------|---------|
| JP | 06-343262 | 12/1994 |
| JP | 07-007928 | 1/1995 |
| WO | 2006/101188 | 9/2006 |

OTHER PUBLICATIONS

Office Action mailed Feb. 11, 2009 in co-pending U.S. Appl. No. 11/699,075.
Office Action issued Jun. 5, 2009 in corresponding Japanese Application No. 2006-019746 with an at least partial English language translation thereof.

* cited by examiner

*Primary Examiner*—Harry Behm
(74) *Attorney, Agent, or Firm*—Nixon & Vanderhye P.C.

(57) ABSTRACT

The control apparatus for controlling a voltage transforming apparatus having a transformer, power switching elements disposed in a primary side, and synchronous-rectifying switching elements disposed in a secondary side includes a judging circuit making a judgment as to whether or not an output current of the voltage transforming apparatus is smaller than a specified current on the basis of a primary-side current of the transformer and an inhibition circuit inhibiting the synchronous-rectifying switching elements from performing their synchronous-rectifying control operation when the judging circuit judges that the output current is smaller than the specified current. The judging circuit makes the judgment with compensating for a variation of a relationship between the primary side-current and the output current due to variation of duty ratio of the power switching elements, and variation of at least one of the DC output voltage and the DC input voltage of the voltage transforming apparatus.

12 Claims, 13 Drawing Sheets

CONTROL APPARATUS FOR INHIBITING SYNCHRONOUS-RECTIFIER SWITCHING ELEMENTS AT LOW OUTPUT CURRENT FOR A VOLTAGE TRANSFORMING APPARATUS

CROSS-REFERENCE TO RELATED APPLICATION

This application is related to Japanese Patent Application No. 2006-19746 filed on Jan. 27, 2006, the contents of which are hereby incorporated by reference.

BACKGROUND OF THE INVENTION

1. Field of the Invention

The present invention relates to a control apparatus for a voltage transforming apparatus having a transformer and configured to rectify an AC voltage being transformed by the transformer by use of synchronous-rectifying switching elements which are provided in the secondary side of the transformer and are turned on and off in synchronization with power switching elements provided in the primary side of the transformer, and to smooth the rectified DC voltage.

2. Description of Related Art

It is known to provide a voltage transforming apparatus having a transformer with synchronous-rectifying switching elements instead of a diode serving as a rectifying means in the secondary side of the transformer. Since the on-resistance of the synchronous-rectifying switching elements is smaller than that of the diode, replacing the diode with the synchronous-rectifying elements makes it possible to reduce power loss of the voltage transforming apparatus.

However, it should be noted that the voltage transforming apparatus provided with the synchronous-rectifying switching elements cannot always perform their synchronous rectifying control operations, because when the output current of the voltage transforming apparatus is small, there is a fear that the output current flows back through the synchronous-rectifying elements, which lowers the performance and reliability of the synchronous-rectifying elements.

Accordingly, it has been proposed to monitor the output current of the voltage transforming apparatus on the basis of a voltage drop across a current-detecting resistor provided in the secondary side of the transformer, and to inhibit the synchronous-rectifying control operation if the voltage drop indicates that the back flow of the output current can occur.

Incidentally, in recent years, some hybrid vehicles are provided with such a voltage transforming apparatus for the purpose of stepping down a DC output voltage of a high-voltage source, and charging a low-voltage battery by this stepped-down DC voltage. In this case, since a large output current flows in the secondary side of the transformer, the current-detecting resistor produces a large amount of heat. This can cause the voltage transforming apparatus to become large in size. In addition, in this case, the current-detecting resistor is required to have a highly accurate resistance value.

It may occur that a hall element is used instead of the current-detecting resistor. However, using the hall element increases the production cost of the voltage transforming apparatus, because the hall element is expensive.

For such reasons, it has been attempted to estimate the output current flowing in the secondary side of the transformer on the basis of a current flowing in the primary side of the transformer. However, since the current flowing in the primary side of the transformer is an intermittent current, and in addition, it varies depending on the way in which a duty control of the power switching elements provided in the primary side is performed, the output voltage of the high voltage source, and the output voltage of the voltage transforming apparatus, even when the output current of the voltage transforming apparatus is kept constant. Accordingly, it has been very difficult to make the correct judgment as to whether the synchronous-rectifying control operation should be performed or stopped on the basis of the detected value of the current flowing in the primary side of the transformer.

SUMMARY OF THE INVENTION

The present invention provides a control apparatus for controlling a voltage transforming apparatus having a transformer, power switching elements provided in a primary side thereof and operating to invert a DC input voltage to an AC voltage, synchronous-rectifying switching elements provided in a secondary side thereof and performing synchronous-rectifying control operation in synchronization with the power switching elements in order to rectify the AC voltage transformed by the transformer into a DC output voltage, and a smoothing circuit smoothing the DC output voltage, the control apparatus comprising:

a judging circuit making a judgment as to whether or not an output current of the voltage transforming apparatus is smaller than a specified current on the basis of a primary-side current flowing through a primary coil of the transformer; and an inhibition circuit inhibiting the synchronous-rectifying switching elements from performing the synchronous-rectifying control operation when the judging circuit judges that the output current is smaller than the specified current;

wherein the judging circuit makes the judgment while compensating for a variation of a relationship between the primary side-current and the output current due to variation of duty ratio of the power switching elements, and variation of at least one of the DC output voltage and the DC input voltage.

According to the present invention, it becomes possible to appropriately perform the switching between permission and inhibition of the synchronous-rectifying control operation on the basis of the detected value of the primary-side current of a transformer included in a voltage transforming apparatus.

The judging circuit may include a comparator comparing a detection value of the primary-side current with a threshold value corresponding to the specified current, and a compensating circuit compensating one of the detection value and the threshold value being inputted to the comparator on the basis of a compensation value by which the relationship between the primary-side current and the output current is compensated for.

The control apparatus may further comprise a periodic wave signal generating circuit generating a periodic wave signal repeating a cycle of monotone increase and monotone decrease, the compensating circuit compensating one of the detection value and the threshold value by use of the periodic wave signal.

The periodic wave signal may be a triangular wave signal, and the compensating circuit may compensate one of the detection value and the threshold value by superposing the triangular wave signal onto the detection value.

The control apparatus may further comprise an error detecting circuit generating an error signal having a value depending on a value of the output voltage of the voltage transforming apparatus, and a PWM modulating circuit generating PWM-modulated drive signals to be applied to the power switching elements on the basis of comparison result between the error signal and a carrier signal produced from the periodic wave signal.

The compensating circuit may compensate one of the detection value and the threshold value in accordance with the DC output voltage of the voltage transforming apparatus.

The inhibition circuit may inhibit the synchronous-rectifying switching elements from performing the synchronous-rectifying control operation when the judging circuit judges that the output current immediately before the power switching elements are turned off is smaller than the threshold current.

Other advantages and features of the invention will become apparent from the following description including the drawings and claims.

PREFERRED EMBODIMENTS OF THE INVENTION

First Embodiment

Figure 1:
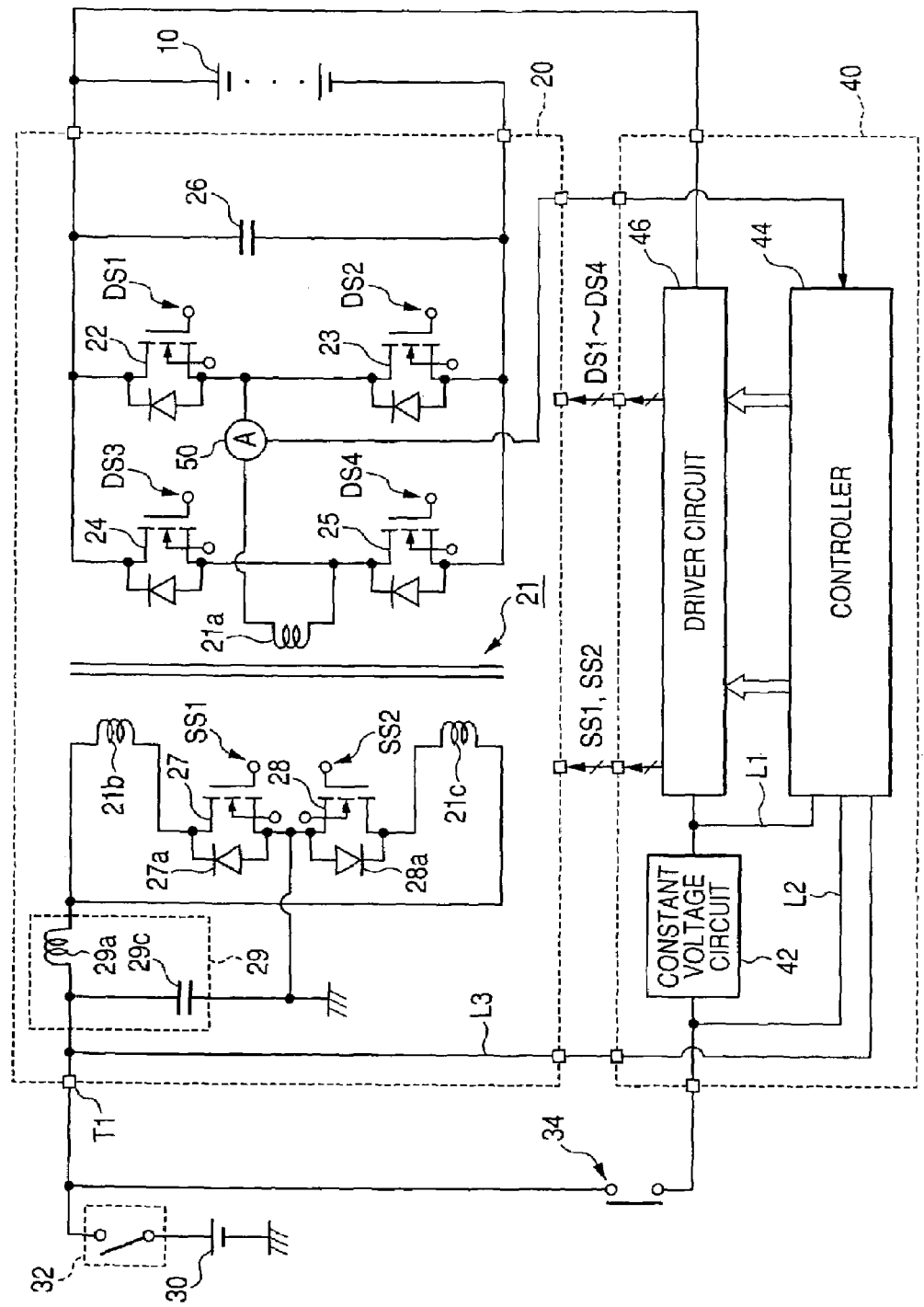
FIG. 1 is a diagram showing a structure of a DC-DC converter as a voltage transforming apparatus, and a structure of a control apparatus according to a first embodiment of the invention used for controlling the DC-DC converter.

FIG. 1 is a diagram showing a structure of a DC-DC converter 20 as a voltage transforming apparatus, and a structure of a control apparatus 40 according to a first embodiment of the invention, which is for controlling the DC-DC converter 20.

The DC-DC converter 20 is for stepping down a DC output voltage of a high-voltage battery 10 accumulating electric power generated by a generator mounted on a hybrid vehicle, and charging a low-voltage battery 30 by the stepped down DC voltage. The DC-DC converter 20 has a transformer 21 for stepping down the output voltage of the high-voltage battery 10 depending on a turn number ratio between a primary coil 21a and secondary coils 21b, 21c of the transformer 21.

A primary-side circuit of the DC-DC converter 20 includes a series of power switching elements 22, 23 a series of power switching elements 24, 25, and a capacitor 26 which are series-connected to the high-voltage battery 10. The power switching elements 22 to 25 operate to invert an input DC voltage supplied from the high-voltage battery 10 into an AC voltage. The primary coil 21a is connected to a connection node of the power switching elements 22, 23 at one end thereof and to a connection node of the power switching elements 24, 25 at the other end thereof.

On the other hand, a secondary-side circuit of the DC-DC converter 20 includes a series of synchronous-rectifying switching elements 27, 28 and a smoothing circuit 29 constituted by an inductor 29a and a capacitor 29c. The series of the synchronous-rectifying switching elements 27, 28 is connected between the secondary coils 21b, 21c. Each of the synchronous-rectifying switching elements 27, 28 is provided with a diode connected thereacross. A connection node of the synchronous-rectifying switching elements 27, 28 is grounded. One terminals of the synchronous-rectifying switching elements 27, 28 which are not grounded are connected to one end of the inductor 29a of the smoothing circuit 29. The other end of the inductor 29 is connected to one terminal of the capacitor 29 which is grounded at the other terminal thereof.

The control apparatus 40 supplies the power switching elements 22 to 25 with drive signals DS1 to DS4, respectively, so that the power switching elements 22-25 operate to keep the output voltage of the DC-DC converter 20 at a desired value. At this time, the control apparatus 40 also supplies the synchronous-rectifying switching elements 27, 28 with drive signals SS1, SS2, respectively, so that the synchronous-rectifying switching elements 27, 28 operate in synchronization with the power switching elements 22 to 25 in order to rectify a current flowing through the secondary coil 21b or 21c.

The control apparatus 40, which includes a controller 44 and a drive circuit 46, is supplied with electric power from the low-voltage battery 30 when an ignition switch 32 is turned on to close a contact of a control relay 34. The control apparatus 40 further includes a constant voltage circuit 42 which receives the output voltage of the low-voltage battery 30, and generates a constant voltage to be supplied to the driver circuit 46. The constant voltage is also supplied to the controller 44 through a power supply line L1.

The controller 44 has a function of monitoring the state of the control relay 34 through a monitoring line L2 connected between the controller 44 and an input terminal of the constant voltage circuit 42 connected to the control relay 34. The controller 44 has also a function of monitoring the output voltage of the DC-DC converter 20 through a monitoring line L3 connected between an output terminal T1 of the DC-DC converter 20 and the controller 44. The drive circuit 46 generates the drive signals DS1 to DS4 in accordance with the monitored output voltage of the DC-DC converter 20. The drive signals DS1 to DS4 are signals for adjusting duty ratio (on-time period) of the power switching elements 22 to 25 depending on the difference between the output voltage of the DC-DC converter 20 and a desired voltage. The controller 44 also generates the drive signals SS1, SS2 in accordance with a value of a current flowing through the primary coil 21a which is detected by a current sensor 50 connected between the connection node of the power switching elements 22, 23 and the primary coil 21a.

Next, the control operation of the synchronous-rectifying switching elements 27, 28 is explained.

Figure 2:
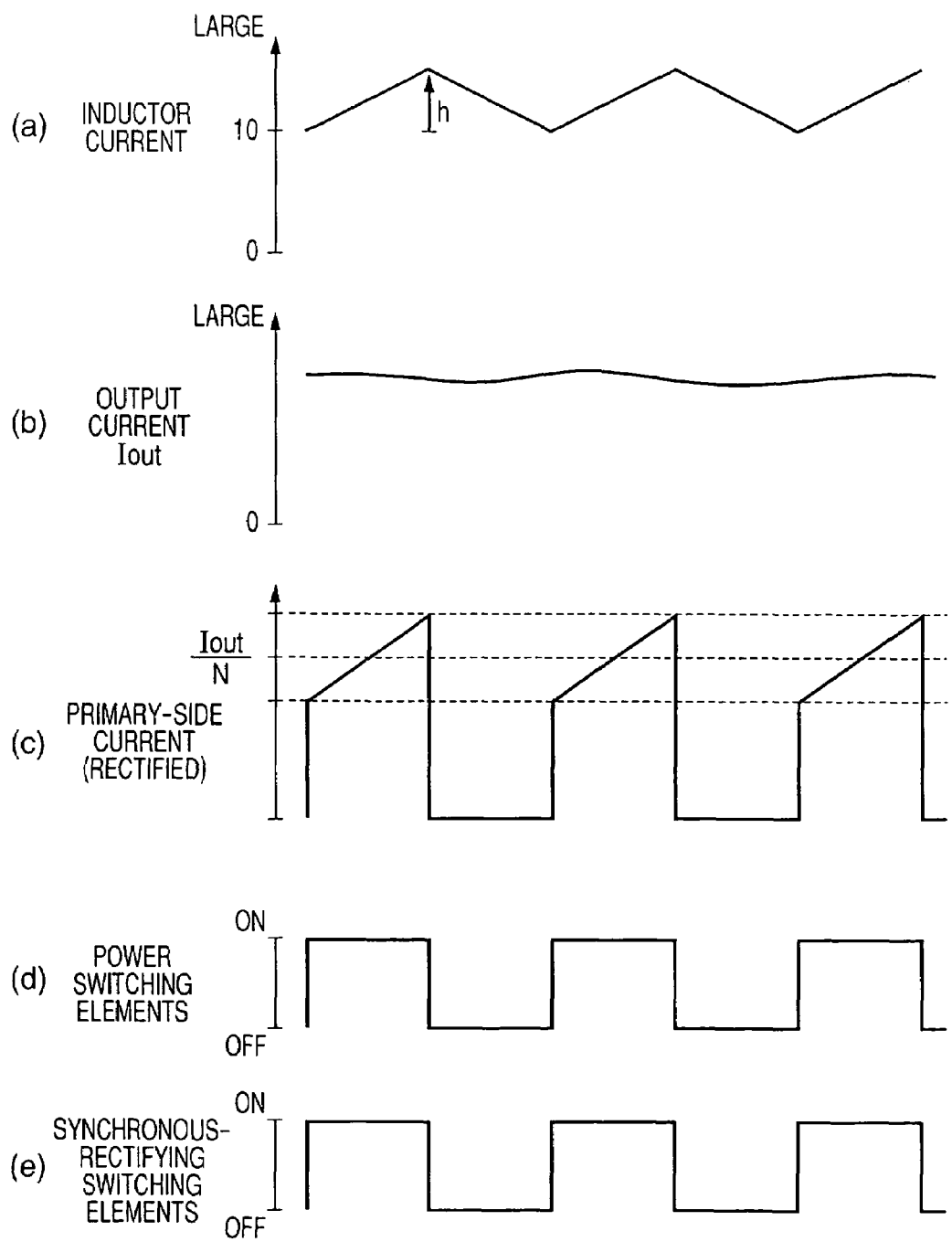
FIG. 2 is a diagram showing temporal changes of various signals in the DC-DC converter.

FIG. 2 shows temporal changes of an inductor current, or a current flowing through the inductor 29a ((a) in FIG. 2), the output current Iout of the DC-DC converter 20 ((b) in FIG. 2), a primary-side current, or a current flowing through the primary coil 21a after having been rectified ((c) in FIG. 2), a conduction state of one of the pair of the power switching elements 22, 25 and the pair of the power switching elements 24, 23 ((d) in FIG. 2), and a conduction state of one of the synchronous-rectifying switching elements 27, 28 ((e) in FIG. 2).

As shown in these figures, when one of the pair of the power switching elements 22, 25 and the pair of the power switching elements 24, 23 is turned on, and a corresponding one of the synchronous-rectifying switching elements 27, 28 is turned on synchronously, the inductor current increases gradually. On the other hand, when the one of the pairs is turned off, and the corresponding one of the synchronous-rectifying switching elements 27, 28 is turned off synchronously, the inductor current decreases gradually. When the synchronous-rectifying switching element 27 or 28 is turned off, the diode 27a or 28a connected thereacross allows a surge current to pass therethrough. Since the inductor current, which repeats the cycle of gradual increase and gradual decrease, is smoothed by the capacitor 29c, the output current Iout of the DC-DC converter 20 becomes substantially a constant current as shown in (b) in FIG. 2.

On the other hand, the primary-side current (the current flowing through the primary coil 21a) is an intermittent current which sharply rises to a certain value and then increases gradually when one of the pair of the power switching elements 22, 25 and the pair of the power switching elements 24, 23 is turned on (may be referred to simply as "on-operation" hereinafter), and sharply falls to zero when the one of the pairs is turned off (maybe referred to simply as "off-operation" hereinafter) as shown in (c) in FIG. 2. Also, as shown in (c) in FIG. 2, an intermediate value between the values of the primary-side current immediately after the on-operation and immediately before the off-operation is approximately equal to the output current Iout divided by the turn number ratio N of the transformer 21, that is, approximately equal to Iout/N. The reason is that the value of the rectified primary-side current is equal to a sum of the value Iout/N, a value of an AC component of the inductor current divided by the turn number ratio N, and a value of an excitation current of the transformer 21. Here, when the turn number of the primary coil 21a is Np, and the turn number of the secondary coil 21b, 21c is Ns, the turn number ratio N is equal to Np/Ns.

It should be noted that the synchronous-rectifying switching elements 27, 27 cannot always perform the synchronous rectifying control operation. The reason is that, since the backflow of the inductor current can deteriorate the synchronous-rectifying switching elements 27, 28, the synchronous-rectifying switching elements 27, 28 have to be inhibited from turning on during a period immediately before the on-operation. In this embodiment, the value of the secondary-side current or the inductor current is estimated from the detected value of the rectified primary-side current, and the switching between permission and inhibition of the synchronous-rectifying control operation is performed on the basis of the estimated secondary-side current. Here, points to note when detecting the primary-side current are set forth below.

Figure 3A:
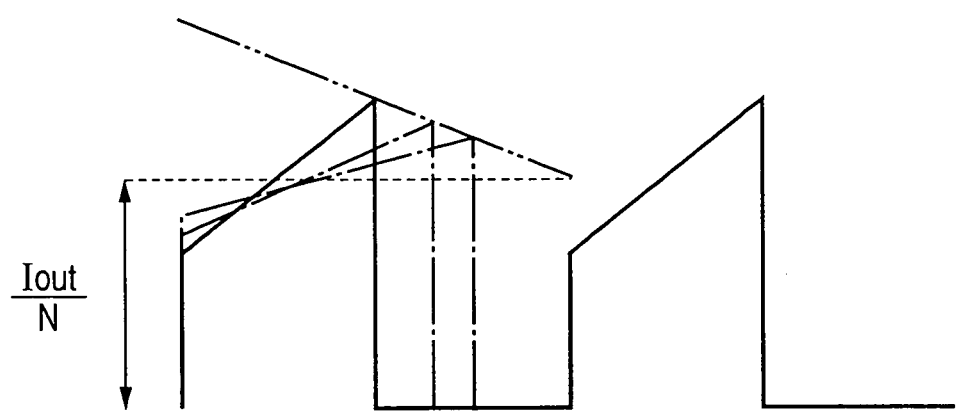
FIG. 3A is a diagram explaining how a rectified primary-side current of the DC-DC converter varies depending on a duty ratio of switching elements included in the DC-DC converter.

FIG. 3A shows how the rectified primary-side current varies depending on the duty ratio of the power switching elements 22 to 25 when the output current Iout is kept constant. As shown in this figure, the peak value of the rectified primary-side current reduces with the increase of the duty ratio. In addition, the rising edge value of the rectified primary-side current varies also depending on the duty ratio. Accordingly, it is difficult to detect the value IO of the inductor current at the moment when it changes from the gradually decreasing state to the gradually increasing state on the basis of the value of the rectified primary-side current. The value IO at this moment may be referred to as "switch-point current value" hereinafter.

Figure 3B:
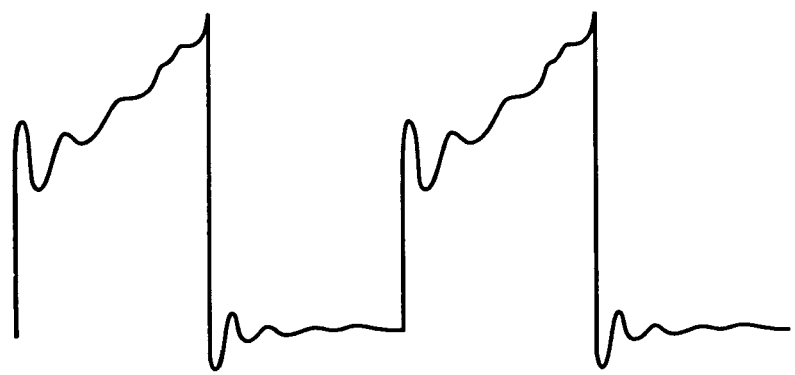
FIG. 3B is a diagram showing a switching noise contained in the rectified primary-side current of the DC-DC converter.

Moreover, as shown in FIG. 3B, the primary-side current contains switching noise (surge noise) which takes its maximum immediately after the on-operation, and decreases gradually thereafter.

Hence, it is preferable to detect the primary-side current immediately before the off-operation from the view point of minimizing the effect of the surge noise. In addition, to accurately estimate the secondary-side current from the primary-side current, it is preferable to compensate for the effect of the duty ratio on a relationship between the primary-side current and the output current.

In this embodiment, it is noted that the primary-side current after the on-operation reduces linearly with the increase of the duty ratio as indicated by the chain double-dashed line in FIG. 3A. The value of the rectified primary-side current superimposed by a sawtooth-wave signal indicated by the shaded area shown in FIG. 4 becomes constant during a period after the on-operation and before the off-operation when the output current Iout is kept constant.

Next, detailed explanation is made as to the waveform of the sawtooth-wave signal.

The value IL of the inductor current when the synchronous-rectifying switching element 27 or 28 is turned on is given by the following equation (c1).

$$IL = (Vin/N - Vout)t/L + IO \qquad (c1),$$

where IO is the switch-point current value of the inductor current, Vin is an input DC voltage supplied from the high-voltage battery 10, N is the turn number ratio of the transformer 21, L is the reactance of the inductor 29a, and t is time.

A variation amount h of the inductor current, that is a difference between the value of the inductor current immediately after the on-operation and that immediately before the off-operation, can be obtained by substituting an on-time ton to the time t in the equation (c1). When the duty ratio and switching frequency of the power switching elements 22 to 25 is D and f, respectively, the on-time ton is equal to D/f. Accordingly, the variation value h is given by the following equation (c2).

$$h=(Vin/N-Vout)D/fL \qquad (c2)$$

The value Ic of the primary-side current having been rectified is given by the following equation (c3).

$$Ic=Iout/N-(Vin/N-Vout)D/2fLN+(Vin/N-Vout)t/NL \qquad (c3)$$

The equation (c3) holds on condition that the rectified primary-side current is equal to a sum of the output current Iout divided by the turn number ratio N and the AC component of the inductor current divided by the turn number ration N. Since the reactance of the transformer 21 is far larger than the reactance L of the inductor 29a, the effect of the excitation current of the transformer 21 is negligible compared to the effect of the AC component of the inductor 29a. Accordingly in this embodiment, the AC component of the excitation current of the transformer 21 is neglected.

The second term of the right-hand side of the equation (c3) determines the rising edge value of the rectified primary-side current (the value of the rectified primary-side current immediately after the on-operation). The third term of the right-hand side of the equation (c3) determines variation of the current after the on-operation.

The peak value of the rectified primary-side current immediately before the off-operation can be calculated by substituting the on-time ton into the time t in the equation (c3). Since ton=D/f, the peak value Ip of the rectified primary-side current immediately before the off-operation is given by the following equation (c4).

$$Ip=Iout/N+(Vin/N-Vout)D/2fLN \qquad (c4)$$

Under steady state condition, since the relationship of D=NVout/Vin holds among the input voltage Vin, the output voltage Vout, and the duty ratio D, the second term of the right-hand side of the equation (c4) is given by the following equation (c5).

The second term of the right-hand side of the equation (c4)

$$=(Vin/N-Vout)D/2fLN=(1-D)Vout/2fLN \qquad (c5)$$

Figure 4:
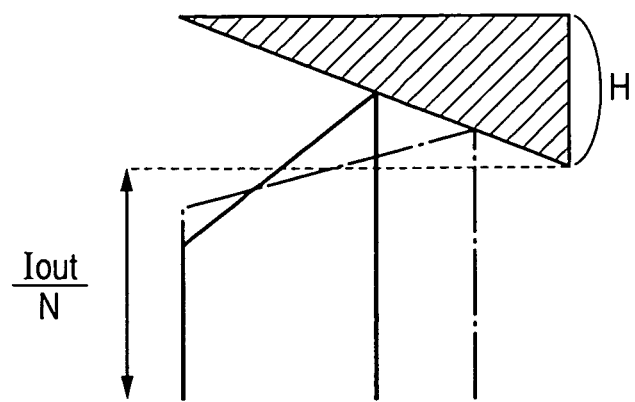
FIG. 4 is a diagram showing a tooth wave signal superimposed onto the rectified primary-side current.

By substituting zero to D in the second term of the right-hand side of the equation (c4), the height H of the sawtooth-wave signal shown in FIG. 4 is given by the following equation (c6).

$$H=Vout/2fLN \qquad (c6)$$

Thus, the sawtooth-wave signal is obtained as F(t) shown in the following equation (c7), which is a function of the time t.

$$F(t)=(Vout/2LN)\times t \qquad (c7)$$

Figure 5:
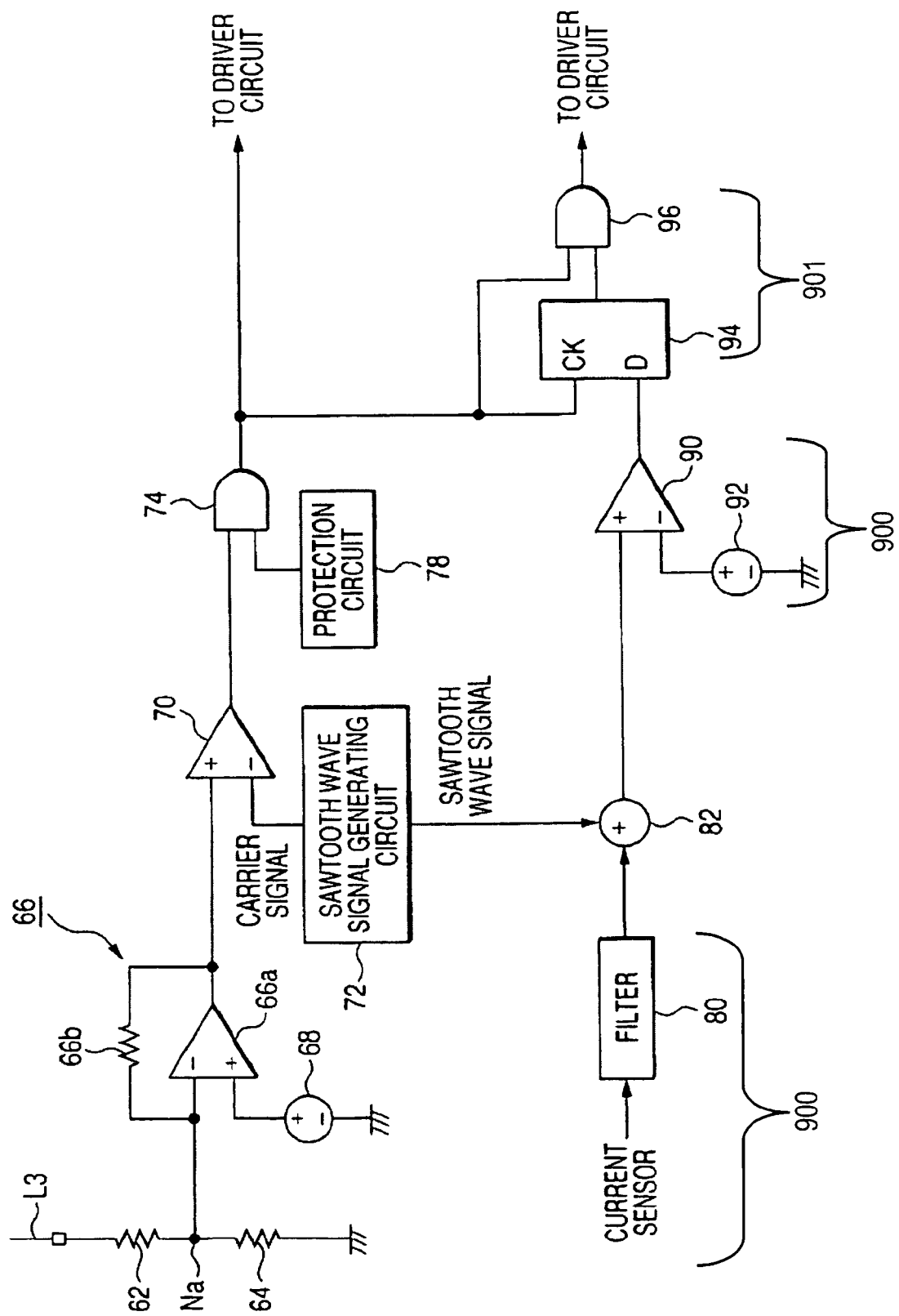
FIG. 5 is a diagram showing a structure of a part of a controller included in the control apparatus according to the first embodiment of the invention, which is dedicated to generation of drive signals applied to the switching elements included in the DC-DC converter.

FIG. 5 shows a structure of a part of the controller 44 dedicated to generation of the drive signals DS1 to DS4 applied to the power switching elements 22 to 25, and the drive signals SS1, SS2 applied to the synchronous-rectifying switching elements 27, 28.

As shown in this figure, a series of resistors 62, 64 is connected between the monitoring line L3 and the ground. A voltage at a connection node Na of the resistors 62, 64 is supplied to an error amplifier 66 as a detected value of the output voltage of the DC-DC converter 20. The error amplifier circuit 66 includes an operational amplifier 66a having an inverting input terminal connected to the connection node Na, a non-inverting input terminal grounded through a reference voltage source 68, and an output terminal connected to the inverting input terminal through a resistor 66b.

The output of the error amplifier circuit 66 is applied to a non-inverting input terminal of a PWM comparator 70. The PWM comparator 70 receives a carrier signal which is a voltage signal having a sawtooth waveform generated by a sawtooth wave signal generating circuit 72 at its inverting input terminal.

The output signal of the PWM comparator 70, which is used as a base to generate the drive signals DS1 to Ds4, has a pulse width depending on a difference between a reference voltage generated by the reference voltage source 68 and the voltage at the connection node Na. The output signal of the PWM comparator 70 is applied to one input terminal of an AND circuit 74 the other input terminal of which is applied with an output of a protection circuit 78. The output of the AND circuit 74 becomes H level when both the output of the PWM comparator 70 and the output of the protection circuit 78 are at H level.

The protection circuit 78 is configured to set its output to L level when a specific condition to inhibit the power switching elements 22 to 25 from operating holds. Such a condition may hold when the temperature of the DC-DC converter 20 rises excessively.

The detected value from the current sensor 50 is supplied to an adder 82 as a compensating circuit through a filter 80. The adder 82 adds the sawtooth wave signal generated by the sawtooth wave signal generating circuit 72 to the output of the filter 80, and applies summation of these signals to a non-inverting input terminal of an inhibition processing comparator 90 whose inverting input terminal is applied with a threshold voltage generated by a reference voltage source 92. This threshold voltage is set at such a value that the secondary-side current or the inductor current does not flow backward.

The output of the inhibition processing comparator 90 is latched by a flip-flop 94 in synchronization with a falling edge of the output of the AND circuit 74. An AND circuit 96 produces a logical product of the output of the AND circuit 74 and the output of the inhibition processing comparator 90 latched by the flip-flop 94, and supplies it to the drive circuit 46 as a base to generate the drive signals applied to the synchronous-rectifying switching elements 27, 28.

The current sensor 50, the filter 80, the inhibition processing comparator 90, and the reference voltage source 92 constitute a judging circuit 900 making a judgment as to whether or not the output current of the DC-DC converter 20 is smaller than a specified current on the basis of the primary-side current flowing through the primary coil of the transformer 21. The flip-flop 94 and the AND circuit 96 constitute an inhibition circuit 901 inhibiting the synchronous-rectifying switching elements from performing the synchronous-rectifying control operation when the judging circuit judges that the output current is smaller than the specified current.

Figure 6:
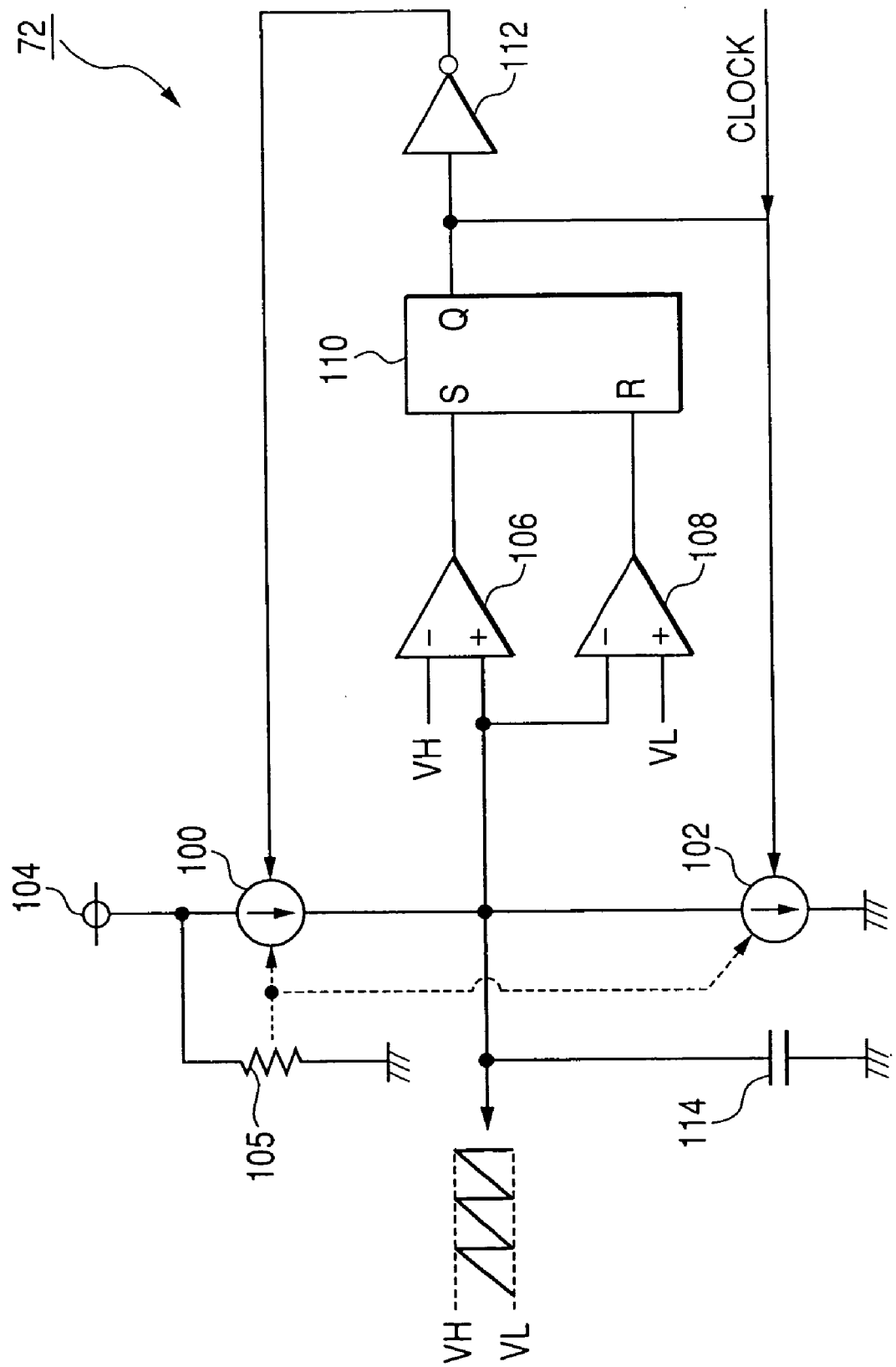
FIG. 6 is a diagram showing a structure of a sawtooth wave signal generating circuit included in the controller of the first embodiment of the invention.

FIG. 6 shows a part of a structure of the sawtooth wave signal generating circuit 72, which is dedicated to production of a base signal used as a base to produce the sawtooth wave signal or the carrier.

The sawtooth wave signal generating circuit 72 includes a current source 100 determining a rising rate of the base signal, and a current source 102 determining a falling rate of the base signal, which are series-connected between a voltage source 104 and the ground. Each of the current sources 100, 102 has an output characteristic which varies depending on a current flowing through a resistor 105 connected between the voltage source 104 and the ground. A connection node of the current sources 100, 102 is connected to a non-inverting input terminal of a comparator 106 and to an inverting input terminal of a comparator 108. An inverting input terminal of the comparator 106 is applied with a higher limit value VH of the base signal, while a non-inverting input terminal of the comparator 108 is applied with a lower limit value VL of the base signal.

The output of the comparator 106 is applied to a set terminal of an RS flip-flop 110, while the output of the comparator 108 is applied to a reset terminal of the RS flip-flop 110. The current source 102 is activated when the output of the RS flip-flop 110 is at H level. The current source 100 is activated when the output of the RS flip-flop 110 is at L level, and accordingly a H-level signal is applied to the current source 100 through an inverter 112. The output terminal of the RS flip-flop 110 is applied with a reference clock CLOCK serving as a reference of fall of the base signal.

A capacitor 114 is connected between the connection node of the current sources 100, 102, and the ground. A terminal voltage of the capacitor 114 makes the base signal. The shape of a waveform of the base signal can be adjusted by adjusting the higher limit value VH, lower limit value VL, capacitance of the capacitor 114, and resistance of the resistor 105.

In this embodiment, the sawtooth wave signal expressed by the equation (c7) is produced by adjusting the capacitance of the capacitor 114 and the resistance of the resistor 105.

Figure 7:
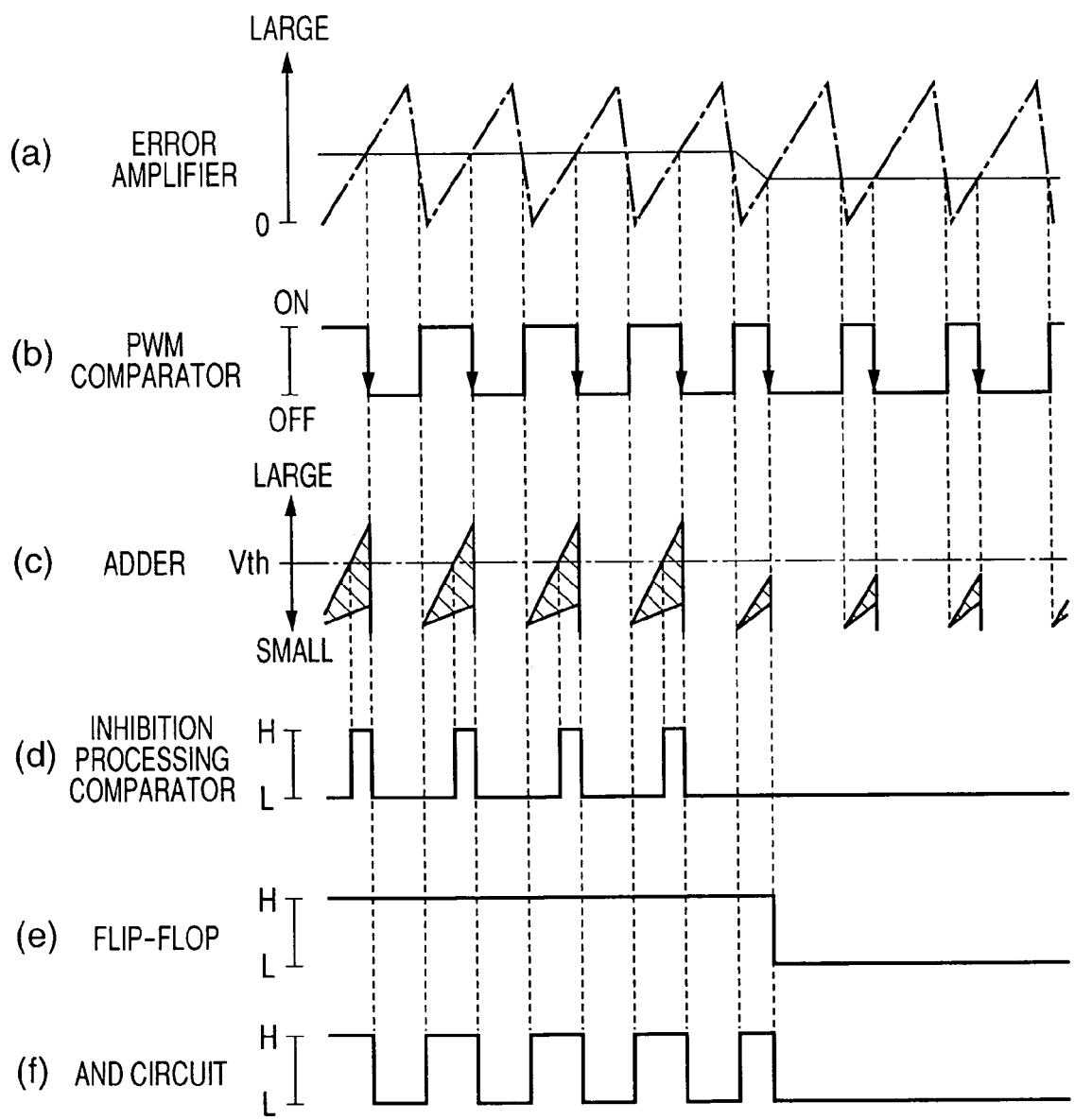
FIG. 7 is a diagram for explaining in which timing switching between permission and inhibition of a synchronous-rectifying control operation by the DC-DC converter is performed.

Next, it is explained how the switching between permission and inhibition of the synchronous-rectifying control operation is performed with reference to FIG. 7. FIG. 7 shows temporal variations of the output of the error amplifier circuit 66 (solid line in (a) in FIG. 7), the output of the carrier signal (chain line in (a) in FIG. 7), the output of the PWM comparator 70 ((b) in FIG. 7), the output of the adder 82 (to be more exact, the primary-side current indicted by solid lines in (c) in FIG. 7, and the sawtooth wave signal superimposed onto the primary-side current, which is indicated by shaded areas in (c) in FIG. 7), the output of the inhibition processing comparator 90 ((d) in FIG. 7), the output of the flip-flop 94 ((e) in FIG. 7), and the output of the AND circuit 96 ((f) in FIG. 7).

As seen from these figures, when the output of the adder 82 exceeds the threshold voltage Vth of the reference voltage source 92 indicated by the chain double-dashed line in (c) in FIG. 7, the output of the inhibition processing comparator 90 becomes H level. On the other hand, when the output of the adder 82 falls below the threshold voltage Vth before the off-operation, since the output of the inhibition processing comparator 90 changes to L level, the output of the flip-flop 94 turns to L level in synchronization with the fall edge of the output of the PWM comparator 70. At this time, the output of the AND circuit 96 becomes L level, as a result of which the synchronous-rectifying switching elements 27, 28 are inhibited from being turned on.

The first embodiment described above offers the following advantages.

(1) The detected value from the current sensor 50 inputted to the inhibition processing comparator 90 is compensated by the sawtooth wave signal. This makes it possible to keep substantially constant the relative magnitude relationship between the two signals inputted to the inhibition processing comparator 90 immediately before the off-operation, as long as the output current Iout is kept constant.

(2) The carrier signal inputted to the PWM comparator 70 and the swatooth wave signal inputted to the adder 82 are produced by the same circuit. This makes it possible for the sawtooth wave signal to be well synchronized with the operations of the power switching elements 22 to 25.

(3) The switching between permission and inhibition of the synchronous-rectifying control operation is performed on the basis of the output of the inhibition processing comparator 90 immediately before the power switching elements 22 to 25 are turned off. This makes it possible to suppress the effect of the surge noise on the detected value of the primary-side current, to thereby more appropriately perform the switching between permission and inhibition of the synchronous-rectifying control operation.

Second Embodiment

A control apparatus according to a second embodiment of the invention is explained below. The below explanation focuses on a difference between the first embodiment and the second embodiment.

Figure 8:
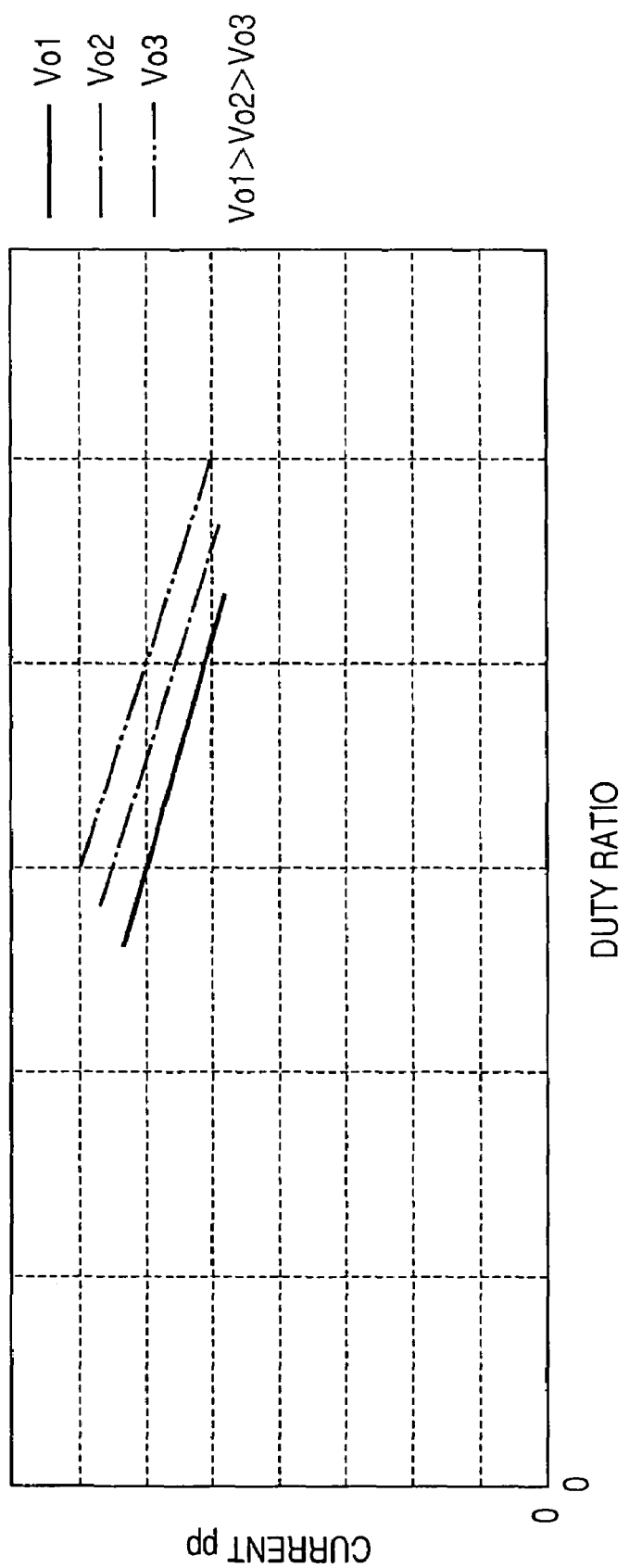
FIG. 8 is a diagram for explaining how a peak value of the primary-side current varies depending on a duty ratio of the switching transistors included in the DC-DC converter.

The second embodiment is characterized in that the detected value of the primary-side current applied to the non-inverting input terminal of the inhibition processing comparator 90 is compensated not only by the sawtooth wave signal but also by the output voltage Vout of the DC-DC converter 20. The reason is that the peak value of the primary-side current varies depending on the duty ratio and also on the output voltage Vout as shown in FIG. 8. As shown in this figure, as the output voltage Vout reduces (Vo1>Vo2>Vo3), the peak value reduces.

Figure 9:
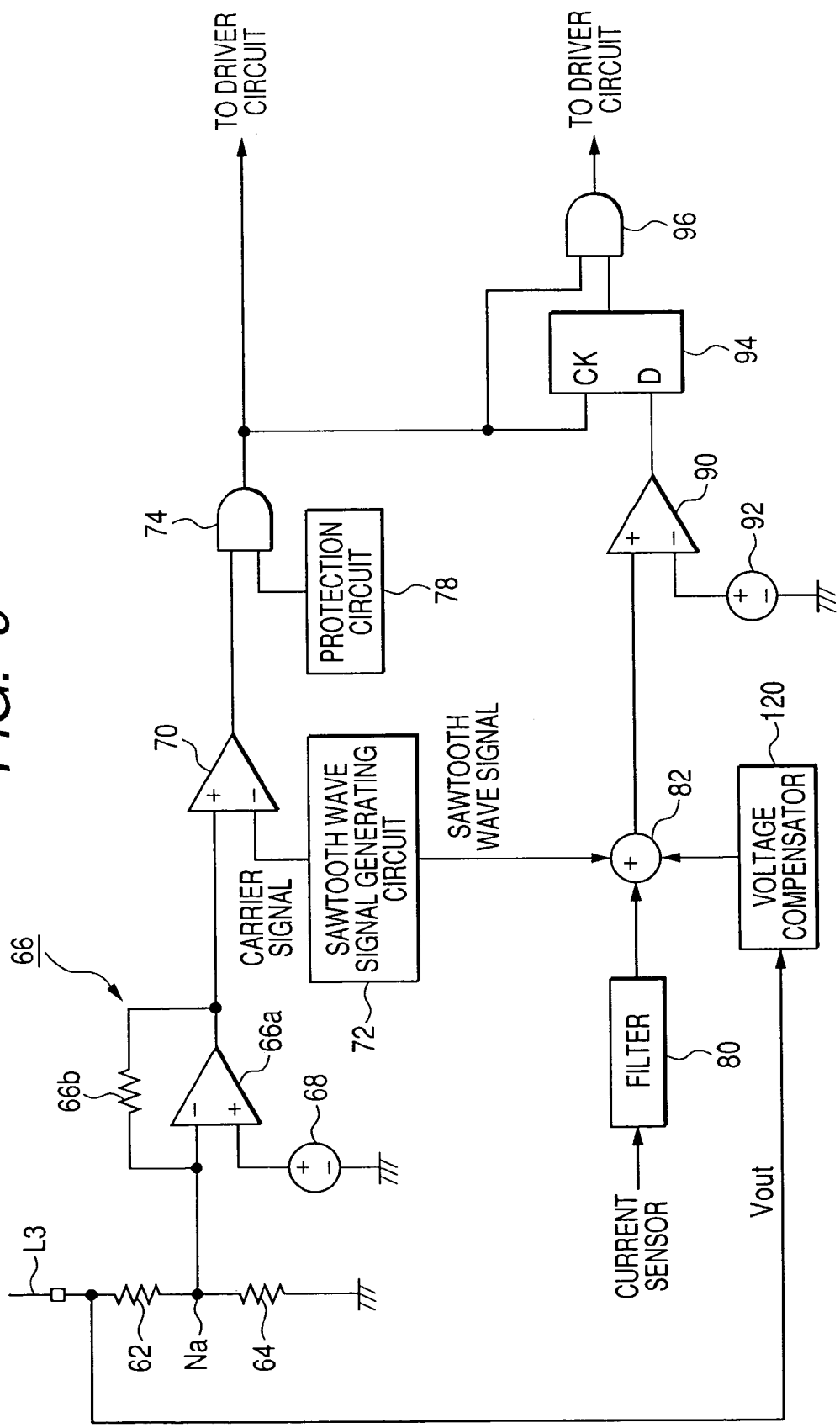
FIG. 9 is a diagram showing a structure of a part of a controller included in a control apparatus according to a second embodiment of the invention, which is dedicated to generation of drive signals applied to switching elements included in the DC-DC converter.

FIG. 9 shows a structure of a part of the controller 44 of the second embodiment, which is dedicated to generation of the drive signals DS1 to DS4 applied to the power switching elements 22 to 25, and the drive signals SS1, SS2 applied to the synchronous-rectifying switching elements 27, 28. In FIG. 9, the reference numerals identical to those in FIG. 5 represent the same elements.

As shown in FIG. 9, the second embodiment is provided with a voltage compensator 120. This voltage compensator 120 is configured to read the output voltage Vout through the monitoring line L3, and output a compensation value depending on the output voltage Vout to the adder 82. The compensation value increases with the reduction of the output voltage Vout. The adder 82 sums up the output of the filter 80, the output of the sawtooth wave signal generating circuit 72, and the output of the voltage compensator 120, and applies the summation to the non-inverting input terminal of the inhibition processing comparator 90.

The second embodiment offers the following advantage in addition to the advantages (1) to (3) offered by the first embodiment.

(4) The detected value from the current sensor 50 inputted to the inhibition processing comparator 90 is compensated by the output voltage Vout. This makes it possible to keep substantially constant the relative magnitude relationship between the two signals inputted to the inhibition processing comparator 90 when the output current Iout is kept constant. This configuration is advantageous when a target value of the output voltage of the DC-DC converter 20 is adjustable by adjusting the reference voltage of the reference voltage source 68 shown in FIG. 9.

Third Embodiment

A control apparatus according to a third embodiment of the invention is explained below. The below explanation focuses on a difference between the second embodiment and the third embodiment.

Figure 10:
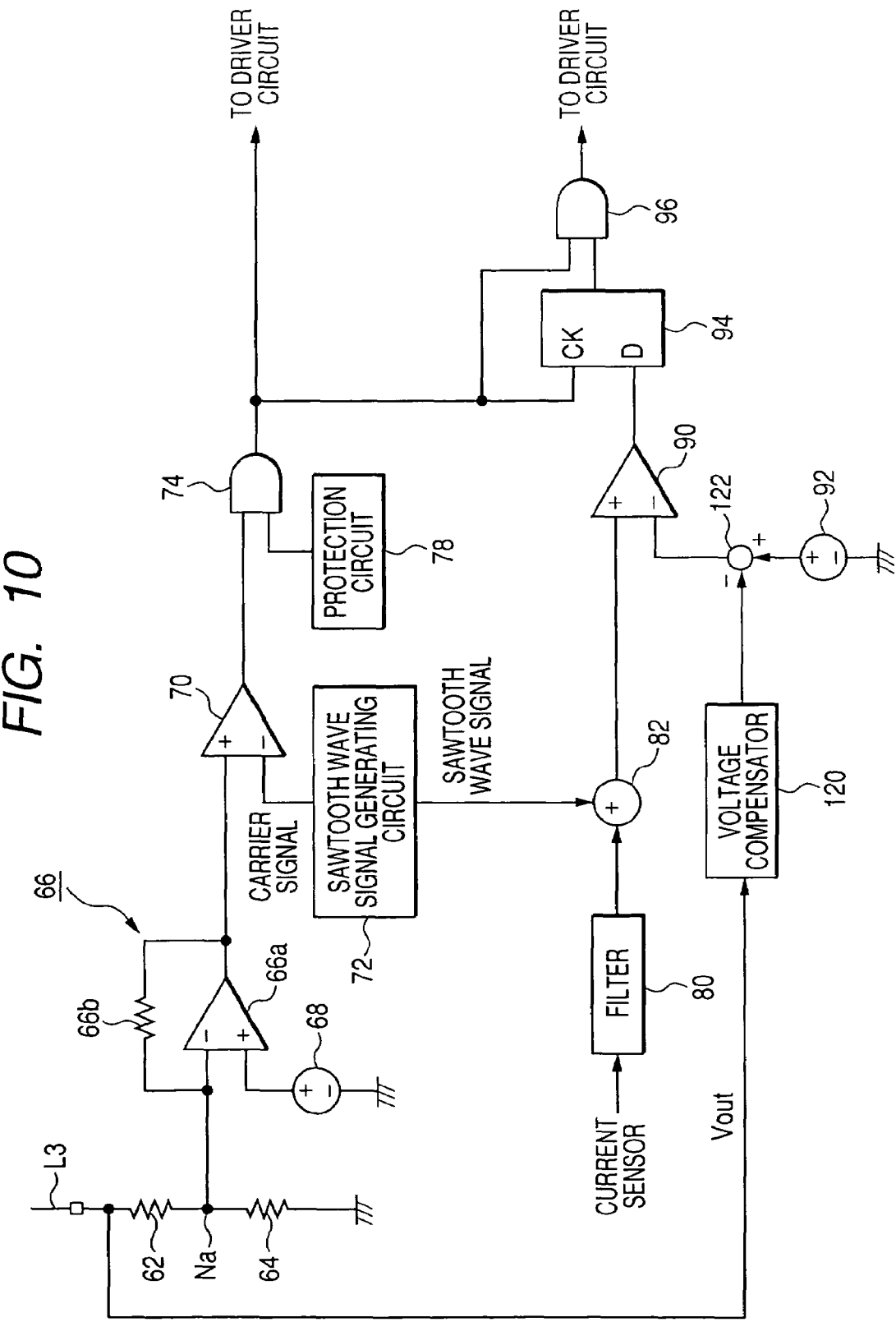
FIG. 10 is a diagram showing a structure of a part of a controller included in a control apparatus according to a third embodiment of the invention, which is dedicated to generation of drive signals applied to switching elements included in the DC-DC converter.

The third embodiment is characterized in that the threshold voltage outputted from the reference voltage source 92 and applied to the inverting input terminal of the inhibition processing comparator 90 is compensated by being subtracted by the output of the voltage compensator 120. FIG. 10 shows a structure of a part of the controller 44 of the third embodiment, which is dedicated to generation of the drive signals DS1 to DS4 applied to the power switching elements 22 to 25, and the drive signals SS1, SS2 applied to the synchronous-rectifying switching elements 27, 28. In FIG. 10, the reference numerals identical to those in FIG. 9 represent the same elements.

As shown in FIG. 10, in the third embodiment, an adder/subtracter 122 is disposed as a compensator circuit between the inhibition processing comparator 90 and the reference voltage source 92 in order to subtract the compensation value outputted from the voltage compensator 120 from the threshold voltage outputted from the reference voltage source 92, and to apply the subtracted threshold voltage to the inverting input terminal of the inhibition processing comparator 90.

The threshold voltage outputted from the reference voltage source 92 is not different between this embodiment and the second embodiment. Also, the relationship between the compensation value outputted from the voltage compensator 120 and the output voltage Vout is not different between this embodiment and the second embodiment. Accordingly, the difference between the values of the two signals respectively applied to the non-inverting input terminal and the inverting input terminal of the inhibition processing comparator 90 is not different between this embodiment and the second embodiment. Hence, also with the third embodiment, it is possible to keep substantially constant the relative magnitude relationship between the two signals inputted to the inhibition processing comparator 90 as long as the output current Iout is kept constant.

Fourth Embodiment

A control apparatus according to a fourth embodiment of the invention is explained below. The below explanation focuses on a difference between the first embodiment and the fourth embodiment.

Figure 11:
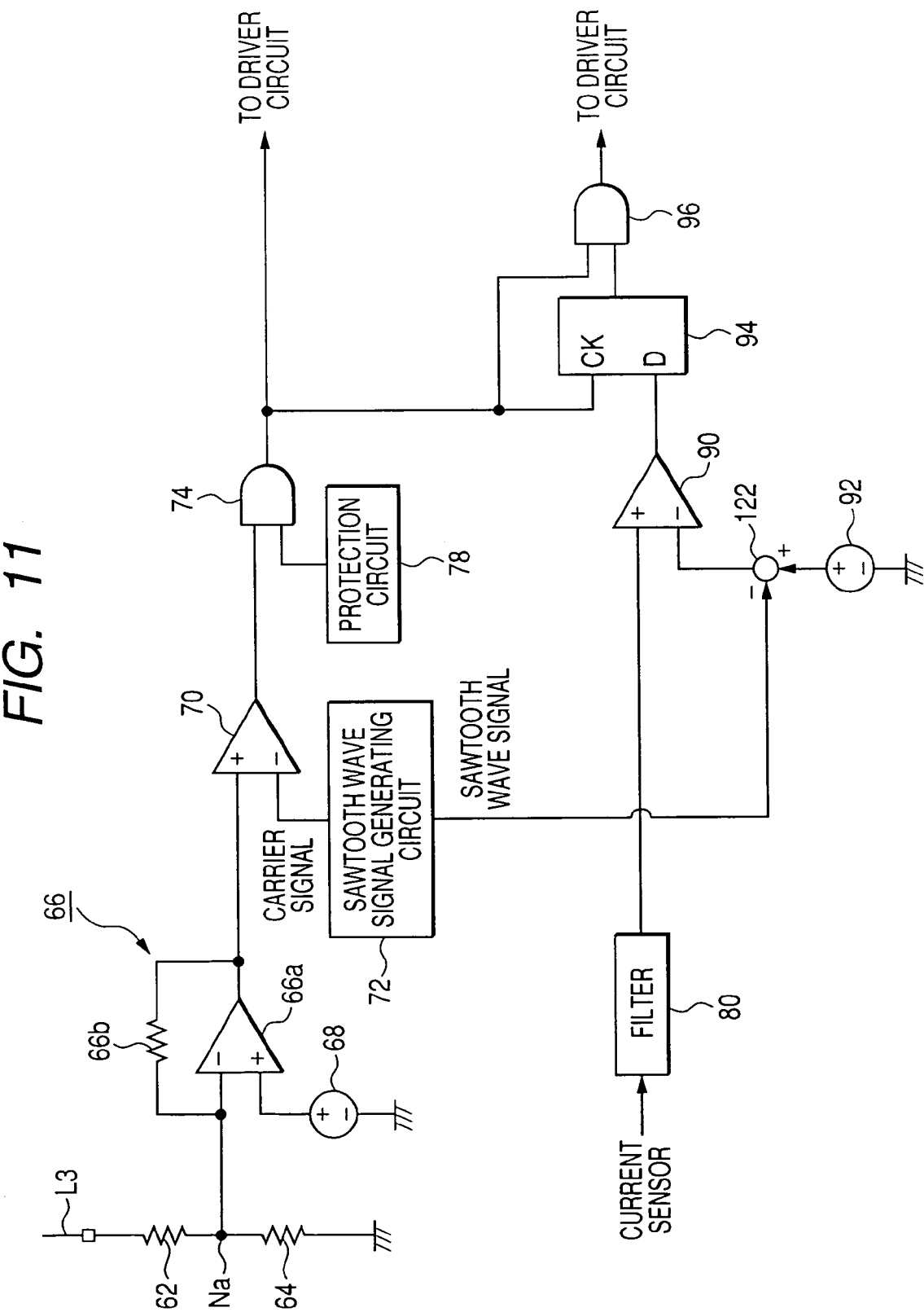
FIG. 11 is a diagram showing a structure of a part of a controller included in a control apparatus according to a fourth embodiment of the invention, which is dedicated to generation of drive signals applied to switching elements included in the DC-DC converter.

The fourth embodiment is characterized in that the threshold voltage outputted from the reference voltage source 92 and applied to the inverting input terminal of the inhibition processing comparator 90 is compensated by being subtracted by the output of the sawtooth wave signal generating circuit 72. FIG. 11 shows a structure of a part of the controller 44 of the fourth embodiment, which is dedicated to generation of the drive signals DS1 to DS4 applied to the power switching elements 22 to 25, and the drive signals SS1, SS2 applied to the synchronous-rectifying switching elements 27, 28. In FIG. 11, the reference numerals identical to those in FIG. 5 represent the same elements.

As show in FIG. 11, in the fourth embodiment, an adder/subtracter 122 is disposed between the inhibition processing comparator 90 and the reference voltage source 92 in order to subtract the sawtooth wave signal as a compensation value outputted from the sawtooth wave signal generating circuit 72 from the threshold voltage outputted from the reference voltage source 92, and to apply the subtracted threshold voltage to the inverting input terminal of the inhibition processing comparator 90.

The threshold voltage outputted from the reference voltage source 92 is not different between this embodiment and the first embodiment. Also, the sawtooth wave signal outputted from the sawtooth wave signal generating circuit 72 and inputted to the adder/subtracter 122 in the fourth embodiment is not different from the sawtooth wave signal outputted from the sawtooth wave signal generating circuit 72 and inputted to the adder 82 in the first embodiment. Accordingly, the difference between the values of the two signals respectively applied to the non-inverting input terminal and the inverting input terminal of the inhibition processing comparator 90 is not different between this embodiment and the first embodiment. Hence, also with the fourth embodiment, it is possible to keep substantially constant the relative magnitude relationship between the two signals inputted to the inhibition processing comparator 90 as long as the output current Iout is constant.

Fifth Embodiment

A control apparatus according to a fifth embodiment of the invention is explained below. The below explanation focuses on a difference between the second embodiment and this fifth embodiment.

In the second embodiment, the compensation value outputted from the voltage compensator 120 and the output voltage Vout are in a one-one relationship. However, in the fifth embodiment, the compensation value is compensated not only by the output voltage Vout, but also by the duty ratio of the power switching elements 22 to 25. The reason for that is explained in detail below.

As understood from the equations (c4) and (c5), the peak value Ip of the primary-side current Ic depends not only on the output voltage Vout, but also on the input voltage Vin and the duty ratio (on-time ratio) D. It should be noted that the relative magnitude relationship between the two signals inputted to the inhibition processing comparator 90 can be kept constant through superposition of the sawtooth wave signal only when the output voltage Vout which the sawtooth wave signal generating circuit 72 uses as a base to generate the sawtooth wave signal is kept at a constant value (referred to as a reference output voltage Vref hereinafter). If the output voltage Vout deviates from the reference output voltage Vref, the difference between the two signals inputted to the inhibition processing comparator 90 shifts by a value delta V depending on the difference between the actual output voltage Vout and the reference output voltage Vref.

Substituting the equation of Vout=Vref+Vout−Vref=Vref+ΔV into the equation (c5), the following equation (c8) is obtained.

$$(1-D)(Vref+\Delta V)/2fLN = (1-D)Vref/2fLN + (1-D)\Delta V/2fLN \quad (c8)$$

Figure 12:
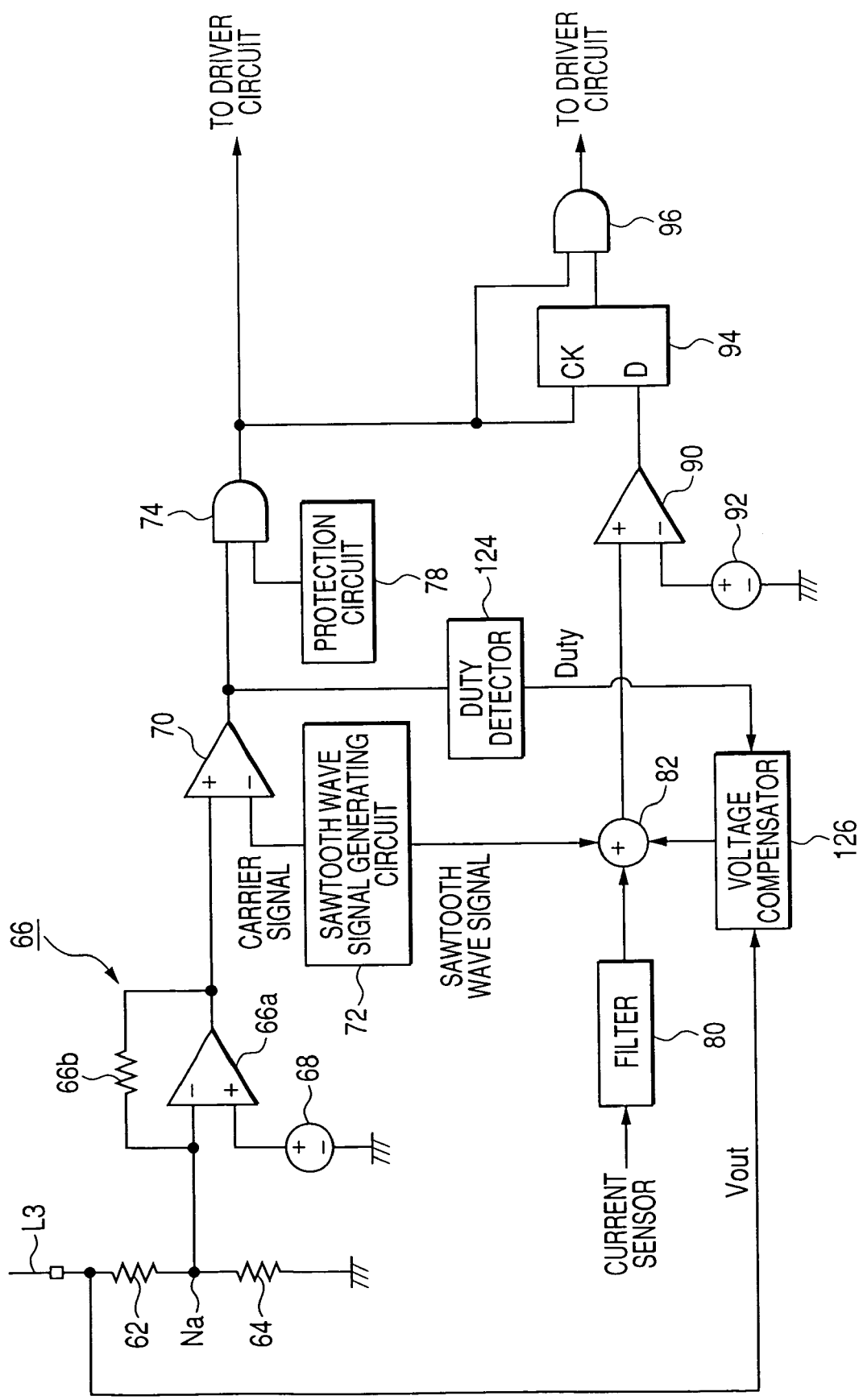
FIG. 12 is a diagram showing a structure of a part of a controller included in a control apparatus according to a fifth embodiment of the invention, which is dedicated to generation of drive signals applied to switching elements included in the DC-DC converter.

The first term of the right-hand side of the equation (c8) is a term whose value becomes constant through the superposition of the sawtooth wave signal, while the second term is a term whose value shifts when the output voltage Vout deviates from the reference output voltage Vref by a value depending on the difference therebetween. In this embodiment, the compensation value is calculated at such a value that compensates for the shift of the value of the second term of the right-hand side of the equation (c8). FIG. 12 shows a structure of a part of the controller 44 of the fifth embodiment, which is dedicated to generation of the drive signals DS1 to DS4 applied to the power switching elements 22 to 25, and the drive signals SS1, SS2 applied to the synchronous-rectifying switching elements 27, 28. In FIG. 12, the reference numerals identical to those in FIG. 9 represent the same elements.

As shown in this figure, the controller 44 of this embodiment is provided with a duty ratio detector 124. This duty ratio detector 124 is configured to read the output of the PWM comparator 70, and calculate the duty ratio D of the power switching elements 22 to 25 on the basis of the output of the PWM comparator 70. The calculated duty ratio D is supplied to the voltage compensator 126.

The sawtooth wave signal generating circuit 72 generates the sawtooth wave signal expressed by the equation (c7), while substituting the reference output voltage Vref into the output voltage Vout in this equation (c7), and supplies it to the adder 82.

The voltage compensator 126 calculates the compensation value on the basis of the output of the duty ratio detector 124 and the output voltage Vout, the compensation value having such a value that the output of the adder 82 is kept constant as long as the output current Iout is kept constant.

The fifth embodiment offers the following advantage in addition to the advantages (1) to (3) offered by the first embodiment, and the advantage (4) offered by the second embodiment.

(5) The detected value from the current sensor 50 inputted into the non-inverting input terminal of the inhibition processing comparator 90 is compensated by the output voltage Vout and the duty ratio D. This makes it possible to well keep constant the relative magnitude relationship between the two signals inputted to the inhibition processing comparator 90 as long as the output current Iout is kept constant.

Sixth Embodiment

A control apparatus according to a sixth embodiment of the invention is explained below. The below explanation focuses on a difference between the first embodiment and this sixth embodiment.

In this embodiment, not the sawtooth wave signal itself, but a compensation value equivalent to a peak height of the sawtooth wave signal is added to the output of the current sensor 50. Here, the height of the sawtooth wave signal indicated by the shaded areas in FIG. 4 immediately before the off-operation can be obtained by substituting the on-time ton to the time t in the equation (c7). Since ton=D/f, the height of the sawtooth wave signal immediately before the off-operation is determined as DVout/2LNf.

Figure 13:
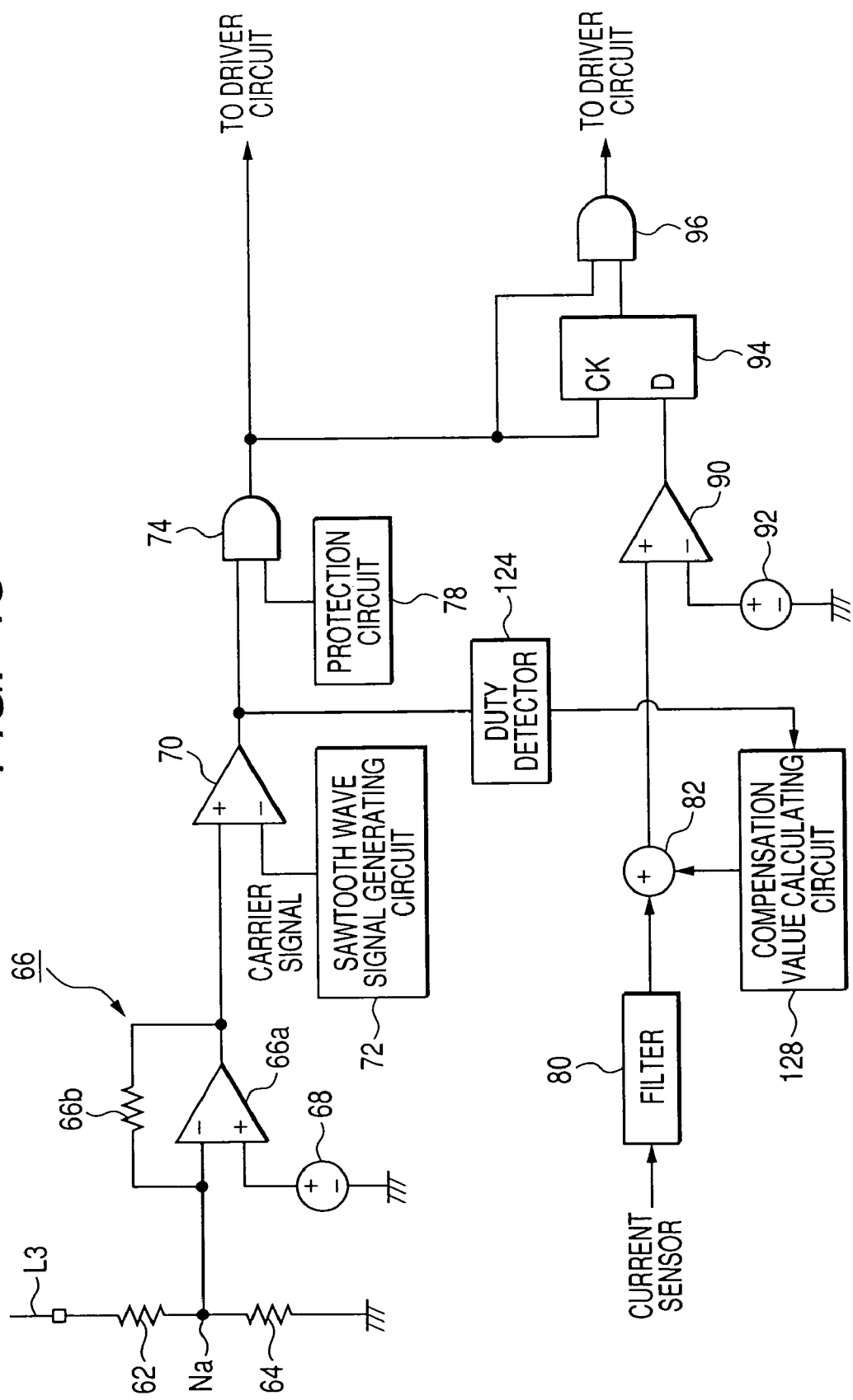
FIG. 13 is a diagram showing a structure of a part of a controller included in a control apparatus according to a sixth embodiment of the invention, which is dedicated to generation of drive signals applied to switching elements included in the DC-DC converter.

FIG. 13 shows a structure of a part of the controller 44 of the sixth embodiment, which is dedicated to generation of the drive signals DS1 to DS4 applied to the power switching elements 22 to 25, and the drive signals SS1, SS2 applied to the synchronous-rectifying switching elements 27, 28. In FIG. 13, the reference numerals identical to those in FIG. 5 represent the same elements.

As shown in this figure, this embodiment is provided with the duty ratio detector 124 explained in the fifth embodiment, and a compensation value calculating circuit 128. The compensation value calculating circuit 128 is configured to calculate DVout/2LNf as a compensation value on the basis of the duty ratio D calculated by the duty ratio detector 124, and outputs it to the adder 82. Also with this embodiment, it is possible to keep substantially constant the relative magnitude relationship between the two signals inputted to the inhibition processing comparator 90 as long as the output current Iout is kept constant.

Seventh Embodiment

A control apparatus according to a seventh embodiment of the invention is explained below.

In the first embodiment, it is judged whether or not the output current Iout exceeds a predetermined value by use of the threshold voltage which is set constant, while on the other hand, in this embodiment, the threshold voltage is set variable in accordance with the duty ratio D and the output voltage Vout. The reason for that is explained in detail below.

The output current Iout can be approximated as a sum of the switch-point current value IO of the inductor current shown in (a) in FIG. 2 and h/2. Accordingly, the output current Iout can be approximated by the following equation (c9).

$$Iout \approx IO + (Vin - Vout)D/2fL \quad (c9)$$

Therefore, the condition to prevent the backflow of the inductor current (IO>0) is given by the following expression (c10).

$$IO \approx Iout - (Vin/N - Vout)D/2fL = Iout - vout(1-D)/2fL \geq 0 \quad (c10)$$

According to the expression (c10), the condition to prevent the backflow of the inductor current depends on the output voltage Vout and the duty ratio D even when the output current Iout is kept constant. Accordingly, in this embodiment, the threshold voltage is adjusted depending on the duty ratio D and the output voltage Vout.

Figure 14:
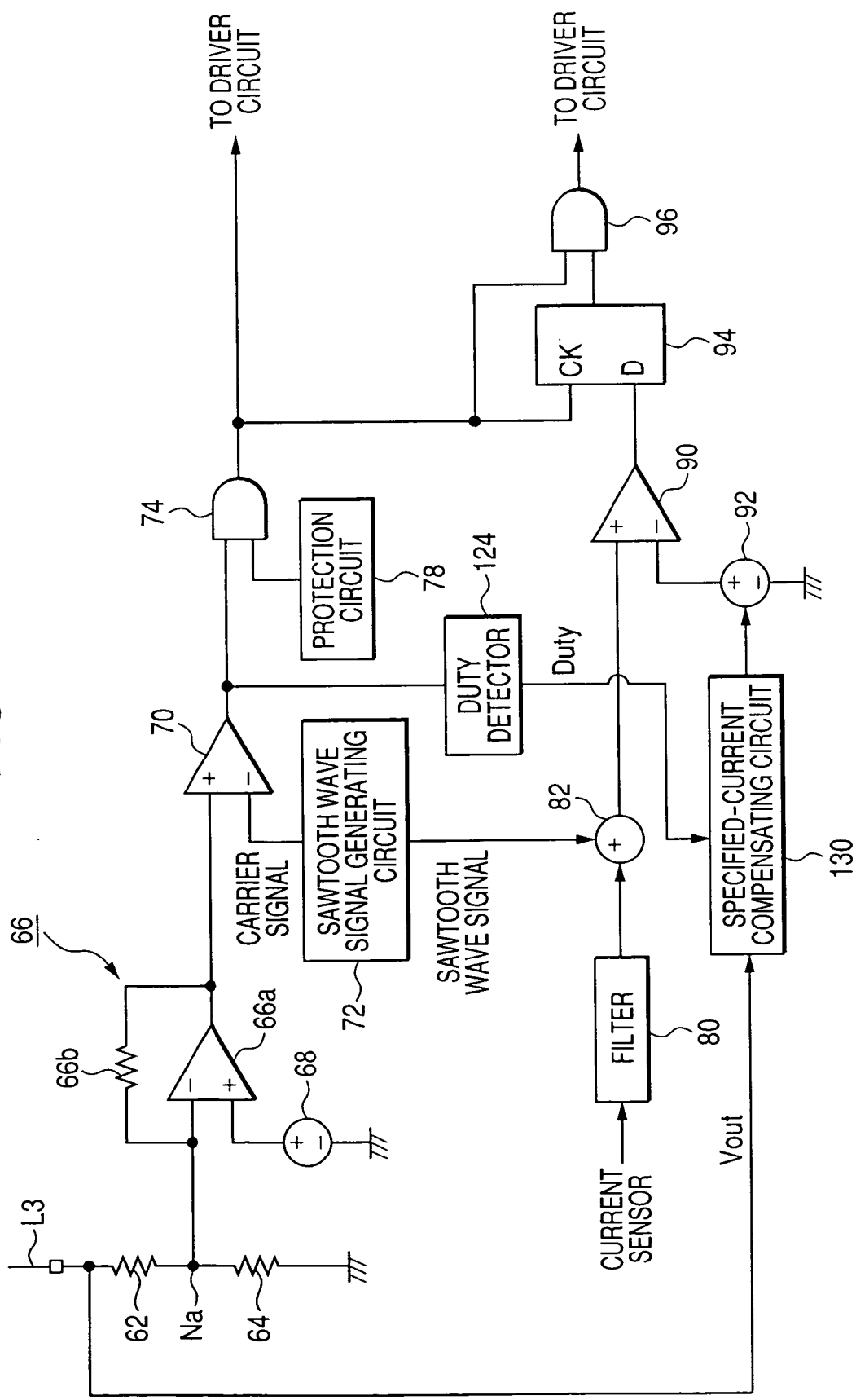
FIG. 14 is a diagram showing a structure of a part of a controller included in a control apparatus according to a seventh embodiment of the invention, which is dedicated to generation of drive signals applied to switching elements included in the DC-DC converter.

FIG. 14 shows a structure of a part of the controller 44 of the seventh embodiment, which is dedicated to generation of the drive signals DS1 to DS4 applied to the power switching elements 22 to 25, and the drive signals SS1, SS2 applied to the synchronous-rectifying switching elements 27, 28. In FIG. 14, the reference numerals identical to those in FIG. 5 represent the same elements.

As shown in this figure, this embodiment is provided with the duty ratio detector 124 explained in the fifth embodiment, and a specified-current compensating circuit 130. The specified-current compensating circuit 130 is configured to set the threshold voltage of the reference voltage source 92 in accordance with the output voltage Vout read through the monitoring line L3 and the output of the duty ratio detector 124.

The seventh embodiment offers the following advantage in addition to the advantages (1) to (3) offered by the first embodiment.

(6) The threshold voltage of the reference voltage source 92 is adjusted in accordance with the duty ratio D and the output voltage Vout. This makes it possible to more appropriately perform the switching between permission and inhibition of the synchronous-rectifying control operation.

Other Embodiments

In the fourth embodiment shown in FIG. 11, the signal applied to either one of the input terminals of the inhibition processing comparator 90 may be further compensated by the output voltage Vout.

In the sixth embodiment shown in FIG. 13, the signal applied to either one of the input terminals of the inhibition processing comparator 90 may be further compensated by the output voltage Vout.

In the seventh embodiment shown in FIG. 14, the output of the reference voltage source 92 may be compensated by use of only one of the duty ratio D and the output voltage Vout.

In each of the above described embodiments, the primary-side current is determined on the basis of the value of the duty ratio D without using the value of the input voltage Vin by referring to the relationship of D=NVout/Vin which holds under steady state condition. However, in the fifth to seventh embodiments (FIG. 12 to FIG. 14), instead of the duty ratio D, the output voltage Vout and the input voltage Vin may be used to determine the primary-side current.

In the first to fifth embodiments and the seventh embodiment, one of the two signals respectively applied to the two input terminals of the inhibition processing comparator 90 is compensated by the sawtooth wave signal generated by the sawtooth wave signal generating circuit 72. However, it may be compensated by a triangular wave signal. In view of the fact that the duty ratio D of the power switching elements 22 to 25 is smaller than 1, it is also possible to use such a signal that increase linearly only immediately before the off-operation instead of the sawtooth wave signal. Generally speaking, a periodic wave signal repeating a cycle of monotone increase and monotone decrease can be used as a signal to compensate one of the two signals respectively applied to the two input terminals of the inhibition processing comparator 90.

In each of the above described embodiments, although the effect of the excitation current of the transformer 21 on the primary-side current is neglected, it may be taken into consideration. The effect of the excitation current of the transformer 21 can be determined in a way similar to the way in which the effect of the inductor 29*a* is determined.

In each of the above described embodiments, the switching between permission and inhibition of the synchronous-rectifying control operation is performed by use of the output of the inhibition processing comparator 90 when the output of the AND circuit 74 falls. However, it may be performed by use of the output of the inhibition processing comparator 90 when the outputs of the drive circuit 46 falls.

In each of the above described embodiments, although the switching between permission and inhibition of the synchronous-rectifying control operation is performed by use of the detected value from the current sensor 5 immediately before the off-operation, it may be performed by use of the detected value from the current sensor 5 at a midpoint of the duration of the on-operation. Since the secondary-side current at this point is at a constant value irrespective of the value of the duty ratio as long as the output current Iout is kept constant, it is possible to compensate for the effect of the duty ratio on the relationship between the primary-side current and the output current. In this case, one of the two signals inputted to the inhibition processing comparator 90 may be compensated in accordance with the output voltage Vout.

In each of the above described embodiments, although the smoothing inductor is provided in the secondary side of the transformer 21, it may be provided in the primary side of the transformer 21.

In each of the above described embodiments, although the controller 44 is constituted by hardware logics, it may be constituted by a CPU and a program describing processing operations of the PWM comparator 70, the sawtooth wave signal generating circuit 72, and the inhibition processing comparator 90. In this case, the sawtooth wave signal can be generated by a counter configured to be incremented at a constant rate, and reset in a certain cycle.

It should be noted that the present invention is applicable not only to a hybrid vehicle by to an electric vehicle as well.

The above explained preferred embodiments are exemplary of the invention of the present application which is described solely by the claims appended below. It should be understood that modifications of the preferred embodiments may be made as would occur to one of skill in the art.

What is claimed is:

1. A control apparatus for controlling a voltage transforming apparatus including a transformer, power switching elements provided in a primary side thereof and operating to invert a DC input voltage to an AC voltage, synchronous-rectifying switching elements provided in a secondary side thereof and performing synchronous-rectifying control operation in synchronization with said power switching elements in order to rectify said AC voltage transformed by said transformer into a DC output voltage, and a smoothing circuit smoothing said DC output voltage, said control apparatus comprising:

a judging circuit making a judgment as to whether or not an output current of said voltage transforming apparatus is smaller than a specified current on the basis of a primary-side current flowing through a primary coil of said transformer; and an inhibition circuit inhibiting said synchronous-rectifying switching elements from performing said synchronous-rectifying control operation when said judging circuit judges that said output current is smaller than said specified current;

wherein said judging circuit makes said judgment while compensating for a variation of a relationship between said primary side-current and said output current due to variation of duty ratio of said power switching elements, and variation of at least one of said DC output voltage and said DC input voltage; and said judging circuit includes a comparator comparing a detection value of said primary-side current with a threshold value corresponding to said specified current, and a compensating circuit compensating one of said detection value and said threshold value being inputted to said comparator on the basis of a compensation value by which said relationship between said primary-side current and said output current is compensated for.

2. The control apparatus according to claim 1, further comprising a periodic wave signal generating circuit generating a periodic wave signal repeating a cycle of monotone increase and monotone decrease, said compensating circuit compensating one of said detection value and said threshold value by use of said periodic wave signal.

3. The control apparatus according to claim 2, wherein said periodic wave signal is a triangular wave signal, said compensating circuit compensating one of said detection value and said threshold value by superposing said triangular wave signal onto said detection value.

4. The control apparatus according to claim 2, further comprising an error detecting circuit generating an error signal having a value depending on a value of said output voltage of said voltage transforming apparatus, and a PWM modulating circuit generating PWM-modulated drive signals to be applied to said power switching elements on the basis of comparison result between said error signal and a carrier signal produced from said periodic wave signal.

5. The control apparatus according to claim 1, wherein said compensating circuit compensates one of said detection value and said threshold value in accordance with said DC output voltage of said voltage transforming apparatus.

6. The control apparatus according to claim 1, wherein said inhibition circuit inhibits said synchronous-rectifying switching elements from performing said synchronous-rectifying control operation when said judging circuit judges that said output current immediately before said power switching elements are turned off is smaller than said threshold current.

7. A method of controlling a voltage transforming apparatus including a transformer, power switching elements provided in a primary side thereof and operating to invert a DC input voltage to an AC voltage, synchronous-rectifying switching elements provided in a secondary side thereof and performing synchronous-rectifying control operation in synchronization with said power switching elements in order to rectify said AC voltage transformed by said transformer into a DC output voltage, and a smoothing circuit smoothing said DC output voltage, said method comprising:

making a judgment as to whether or not an output current of said voltage transforming apparatus is smaller than a specified current on the basis of a primary-side current flowing through a primary coil of said transformer; and inhibiting said synchronous-rectifying switching elements from performing said synchronous-rectifying control operation when said judgment is that said output current is smaller than said specified current;

wherein said judgment is made while compensating for a variation of a relationship between said primary side-current and said output current due to variation of duty ratio of said power switching elements, and variation of at least one of said DC output voltage and said DC input voltage; and said making a judgment includes comparing a detection value of said primary-side current with a threshold value corresponding to said specified current, and compensating one of said detection value and said threshold value being inputted to said comparator on the basis of a compensation value by which said relationship between said primary-side current and said output current is compensated for.

8. The method according to claim 7, further comprising generating a periodic wave signal repeating a cycle of monotone increase and monotone decrease, said compensating includes compensating one of said detection value and said threshold value by use of said periodic wave signal.

9. The method according to claim 8, wherein said periodic wave signal is a triangular wave signal, said compensating includes compensating one of said detection value and said threshold value by superposing said triangular wave signal onto said detection value.

10. The method according to claim 8, further comprising generating an error signal having a value depending on a value of said output voltage of said voltage transforming apparatus, and generating PWM-modulated drive signals to be applied to said power switching elements on the basis of comparison result between said error signal and a carrier signal produced from said periodic wave signal.

11. The method according to claim 7, wherein said compensating including compensating one of said detection value and said threshold value in accordance with said DC output voltage of said voltage transforming apparatus.

12. The method according to claim 7, wherein said inhibition includes inhibiting said synchronous-rectifying switching elements from performing said synchronous-rectifying control operation when said judgment is made that said output current immediately before said power switching elements are turned off is smaller than said threshold current.

* * * * *